United States Patent
Yu et al.

(10) Patent No.: US 8,262,820 B2
(45) Date of Patent: Sep. 11, 2012

(54) METHOD OF WATER DISPERSING PREGELATINIZED STARCH IN MAKING GYPSUM PRODUCTS

(75) Inventors: Qiang Yu, Grayslake, IL (US); Weixin David Song, Gurnee, IL (US)

(73) Assignee: United States Gypsum Company, Chicago, IL (US)

( * ) Notice: Subject to any disclaimer, the term of this patent is extended or adjusted under 35 U.S.C. 154(b) by 475 days.

(21) Appl. No.: 11/413,528

(22) Filed: Apr. 28, 2006

(65) Prior Publication Data

US 2007/0251628 A1    Nov. 1, 2007

(51) Int. Cl.
B32B 13/00    (2006.01)
(52) U.S. Cl. ........................................... 156/39
(58) Field of Classification Search ............... 156/39; 106/772
See application file for complete search history.

(56) References Cited

U.S. PATENT DOCUMENTS

| | | |
|---|---|---|
| 587,944 A | 8/1897 | Eickemeyer |
| 1,230,297 A | 6/1917 | Hite |
| 1,500,452 A | 7/1924 | Haggerty |
| 1,702,729 A | 2/1929 | Hite |
| 1,868,671 A | 7/1932 | Nelson |
| 1,937,472 A | 11/1933 | Ericson |
| 2,207,339 A | 7/1940 | Camp |
| 2,871,146 A | 1/1959 | Etheridge |
| 3,359,146 A | 12/1967 | Lane et al. |
| 3,423,238 A | 1/1969 | Weiland |
| 3,459,571 A | 8/1969 | Shannon |
| 3,573,947 A | 4/1971 | Kinkade et al. |
| 3,666,581 A | 5/1972 | Lane |
| 3,989,534 A | 11/1976 | Plunguian et al. |
| 4,019,920 A * | 4/1977 | Burkard et al. ............... 106/780 |
| 4,051,291 A | 9/1977 | Long |
| 4,265,964 A | 5/1981 | Burkhart |
| 4,392,896 A * | 7/1983 | Sakakibara ..................... 156/39 |
| 4,436,429 A | 3/1984 | Strong et al. |
| 4,533,528 A | 8/1985 | Zaskalicky |
| 4,624,574 A | 11/1986 | Mills et al. |
| 4,632,848 A | 12/1986 | Gosset et al. |
| 4,660,985 A | 4/1987 | Mills et al. |
| 5,013,157 A | 5/1991 | Mills et al. |

(Continued)

FOREIGN PATENT DOCUMENTS

CL    1895-1998    3/1999

(Continued)

OTHER PUBLICATIONS

ASTM Standard C473, "Standard Test Methods for Physical Testing of Gypsum Products," *Annual Book of ASTM Standards*, vol. 04.01, Section 4, 253-263 (1998).

(Continued)

*Primary Examiner* — Daniel McNally
(74) *Attorney, Agent, or Firm* — Leydig Voit & Mayer, Ltd.; Philip T. Petti; David F. Janci

(57) ABSTRACT

The invention provides in one embodiment a gypsum-containing slurry including stucco and an aqueous pre-dispersion of a pregelatinized starch. Also provided is a method of making gypsum wallboard by providing a pre-dispersion of the pregelatinized starch in water, and adding the pregelatinized starch pre-dispersion to the gypsum-containing slurry. The pregelatinized starch can have a particle size distribution within the following range: d (0.1)=about 20μ-35μ, d (0.5)=about 60μ-110μ, d (0.9)=about 100μ-220μ.

14 Claims, 1 Drawing Sheet

U.S. PATENT DOCUMENTS

| | | | |
|---|---|---|---|
| 5,085,929 | A | 2/1992 | Bruce et al. |
| 5,116,671 | A | 5/1992 | Bruce et al. |
| 5,207,830 | A * | 5/1993 | Cowan et al. .............. 106/672 |
| 5,484,200 | A | 1/1996 | Bradshaw |
| 5,558,710 | A | 9/1996 | Baig |
| 5,573,333 | A * | 11/1996 | Dahlman .................. 366/132 |
| 5,575,844 | A | 11/1996 | Bradshaw |
| 5,660,465 | A | 8/1997 | Mason |
| 5,879,446 | A * | 3/1999 | Patel et al. ................ 106/781 |
| 5,922,447 | A | 7/1999 | Baig |
| 6,059,444 | A * | 5/2000 | Johnson et al. ........... 366/172.2 |
| 6,214,102 | B1 | 4/2001 | Vandermeer |
| 6,221,521 | B1 | 4/2001 | Lynn et al. |
| 6,342,284 | B1 * | 1/2002 | Yu et al. .................... 428/70 |
| 6,387,172 | B1 * | 5/2002 | Yu et al. .................... 106/680 |
| 6,409,825 | B1 | 6/2002 | Yu et al. |
| 6,475,313 | B1 | 11/2002 | Peterson et al. |
| 6,596,334 | B1 | 7/2003 | Flickinger et al. |
| 6,632,550 | B1 | 10/2003 | Yu et al. |
| 6,656,984 | B1 | 12/2003 | Haasmaa et al. |
| 6,663,707 | B2 | 12/2003 | Wantling et al. |
| 6,753,377 | B1 | 6/2004 | Niinikoski et al. |
| 6,783,587 | B2 | 8/2004 | Sethuraman et al. |
| 6,800,131 | B2 | 10/2004 | Yu et al. |
| 6,815,049 | B2 | 11/2004 | Veeramasuneni et al. |
| 6,893,752 | B2 | 5/2005 | Veeramasuneni et al. |
| 7,105,587 | B2 | 9/2006 | Tagge et al. |
| RE39,339 | E | 10/2006 | Andersen et al. |
| 7,160,420 | B2 | 1/2007 | Helbling et al. |
| 7,244,304 | B2 | 7/2007 | Yu et al. |
| 7,285,586 | B2 | 10/2007 | Helbling et al. |
| 7,347,895 | B2 | 3/2008 | Dubey |
| 7,364,015 | B2 | 4/2008 | Englert et al. |
| 7,381,261 | B1 | 6/2008 | Nelson |
| 2002/0108532 | A1 * | 8/2002 | Kesselring et al. ...... 106/162.51 |
| 2003/0084980 | A1 * | 5/2003 | Seufert et al. ................ 156/39 |
| 2004/0026002 | A1 | 2/2004 | Weldon et al. |
| 2004/0045481 | A1 | 3/2004 | Sethuraman et al. |
| 2004/0209071 | A1 | 10/2004 | Carbo et al. |
| 2005/0019618 | A1 | 1/2005 | Yu et al. |
| 2005/0048190 | A1 * | 3/2005 | Trksak et al. ................ 426/658 |
| 2005/0061203 | A1 | 3/2005 | Helbling et al. |
| 2005/0067082 | A1 | 3/2005 | Mowry |
| 2005/0084516 | A1 | 4/2005 | Ballard et al. |
| 2005/0191465 | A1 | 9/2005 | Mayers et al. |
| 2005/0219938 | A1 | 10/2005 | Rigaudon et al. |
| 2005/0223949 | A1 | 10/2005 | Bailey, Jr. et al. |
| 2005/0250858 | A1 | 11/2005 | Wantling et al. |
| 2005/0281999 | A1 | 12/2005 | Hofmann et al. |
| 2006/0278135 | A1 | 12/2006 | Liu et al. |
| 2007/0048490 | A1 | 3/2007 | Yu et al. |
| 2007/0048549 | A1 | 3/2007 | Song et al. |
| 2007/0102237 | A1 | 5/2007 | Baig |
| 2007/0221098 | A1 | 9/2007 | Wolbers et al. |
| 2007/0251628 | A1 | 11/2007 | Yu et al. |
| 2008/0070026 | A1 | 3/2008 | Yu et al. |
| 2008/0090068 | A1 | 4/2008 | Yu |
| 2008/0310248 | A1 | 12/2008 | Rigaudon et al. |
| 2009/0010093 | A1 | 1/2009 | Sethuraman et al. |

FOREIGN PATENT DOCUMENTS

| | | |
|---|---|---|
| CL | 1436-2006 | 9/2006 |
| CL | 2217-2006 | 11/2006 |
| EP | 697382 A2 | 2/1996 |
| GB | 1028890 | 5/1966 |
| KR | 10-2006-0123582 A | 12/2006 |
| RU | 2263644 C2 | 10/2005 |
| SU | 885178 A | 11/1981 |
| SU | 887506 | 12/1981 |
| WO | 01/34534 A2 | 5/2001 |
| WO | WO 01/81263 A1 | 11/2001 |
| WO | WO 01/81264 A1 | 11/2001 |
| WO | WO 2004/061042 A1 | 7/2004 |
| WO | WO 2004/083146 A2 | 9/2004 |
| WO | WO 2005/080294 A1 | 9/2005 |

OTHER PUBLICATIONS

Camp, T.F., "The Manufacture of Gypsum Board", Chapter III, Section II, The Manufacture and Technology of Gypsum Products, Dec. 22, 1950.

Petertson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, May 2000, pp. 9-1-9-16.

Anonymous, Programmable logic controller, Retrieved on Jul. 31, 2008 from http://en.wikipedia.org/wiki/Prograrnnmable_logic_controller.

European Patent Office, Extended European Search Report in 07754981.4 (Aug. 26, 2011).

Korean Patent Office, International Search Report in PCT/US2009/055383 (Jun. 3, 2010).

Lin et al., "Characterization and Analysis of Porous, Brittle Solid Structures by Micro CT" Abstracts of Sth World Congress on Industrial Process Tomography, Bergen, Norway, Paper No. VIA07, p. 92 (Sep. 6, 2007)—Lin et al., "Characterization and Analysis of Porous, Brittle Solid Structures by X-Ray Micro CT" JOM, vol. 62, No. 12, p. 91-94, Mineral, Metals and Materials Society, Dec. 2010.

Ratinov, V.B. et al. Dobavki v beton (Concrete Admixtures), in Russian, ISBN 5274005667 / 9785274005661 / 5-274-00566-7, Moscow, Stroyizdat, 1989, pp. 20, 21, 105-110.

US Receiving Office, International Search Report in PCT/US2007/008555 (Jul. 31, 2008).

* cited by examiner

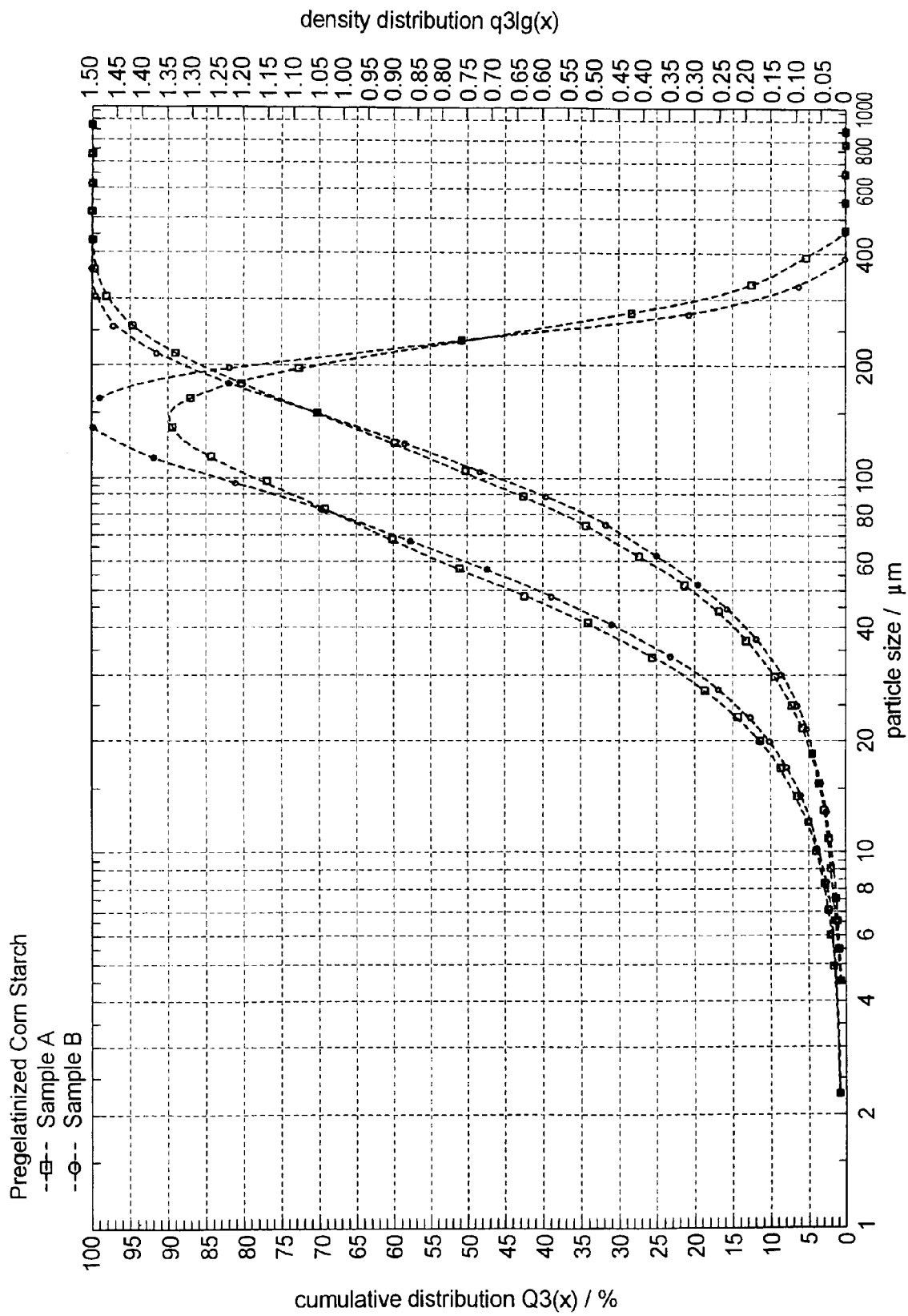

METHOD OF WATER DISPERSING PREGELATINIZED STARCH IN MAKING GYPSUM PRODUCTS

FIELD OF THE INVENTION

The present invention relates to a method of pre-dispersing pregelatinized starch in water, and adding the starch dispersion to gypsum-containing slurries. The method can be used to make gypsum-containing products including gypsum wallboard having increased board strength and reduced board weight.

BACKGROUND OF THE INVENTION

Certain properties of gypsum (calcium sulfate dihydrate) make it very popular for use in making industrial and building products, particularly gypsum wallboard. Gypsum is a plentiful and generally inexpensive raw material which, through a process of dehydration (or calcination) and rehydration, can be cast, molded or otherwise formed into useful shapes. The base material from which gypsum wallboard and other gypsum products are manufactured is the hemihydrate form of calcium sulfate ($CaSO_4 \cdot \frac{1}{2}H_2O$), commonly termed "stucco," which is produced by heat conversion of the dihydrate form of calcium sulfate ($CaSO_4 \cdot 2H_2O$), from which 1½ water molecules have been removed. After rehydration, the hemihydrate dissolves, gypsum crystals precipitate, and the crystal mass sets and becomes solid, providing a set gypsum material.

In order to make gypsum-containing products, gypsum-containing slurries are generally prepared. The gypsum-containing slurries may contain stucco and water, and other known ingredients and additives, such as, for example, starch, dispersants, accelerators, binders, glass fibers, and paper fibers, etc.

Starch is known to be a good binder for gypsum crystals within a set gypsum core, and can increase board strength. In addition, starch can function to provide a better interface between the set gypsum core and a cover sheet in a wallboard product.

Use of a fine ground pregelatinized corn starch (for example, where >99% of particles pass through a 100 mesh screen), in gypsum-containing slurries is known in the art. However, the fine ground starch produces a fine dust that is not easy to handle. Another problem is that the fine starch can require additional process water. For example, one pound of dry fine ground starch can increase water demand by about 10 lb/MSF. (MSF is an industry term for 1,000 square feet.)

Coarse starch, that is larger particle size starch, can be used in the gypsum-containing slurry, since it is less dusty and easier to handle. In addition, larger particle sizes require less water in the slurry. However, due to a larger particle size it is difficult to fully disperse coarse starch in the gypsum slurry using the standard dry basis process, such as during very short-term mixing with water and stucco through a board mixer where contact time is typically less than one second. If a way could be found to effectively use a larger particle size pregelatinized starch, water usage could be reduced and cost savings realized. Additionally, the use of a larger particle size pregelatinized starch could increase board strength, and thus serve as a useful contribution to the art.

BRIEF SUMMARY OF THE INVENTION

In one embodiment, the present invention includes a stucco-containing slurry for making a gypsum wallboard having a set gypsum core, where the slurry includes stucco and an aqueous pre-dispersion of a pregelatinized starch. The pregelatinized starch has a particle size distribution within the following range:

$d(0.1)$=about 20μ-35μ, $d(0.5)$=about 60μ-110μ, $d(0.9)$=about 100μ-220μ.

Other conventional ingredients will also be used in the slurry including, as appropriate, dispersants (such as naphthalenesulfonates), strength additives (such as trimetaphosphates), accelerators, binders, paper fiber, glass fiber, and other known ingredients. A soap foam can be added to reduce the density of the final gypsum wallboard product.

In another embodiment the invention includes a method of making gypsum wallboard by preparing a stucco-containing slurry including water, stucco, and a pregelatinized starch, where the pregelatinized starch is pre-dispersed in water. The pregelatinized starch has a particle size distribution within the following range:

$d(0.1)$=about 20μ-35μ, $d(0.5)$=about 60μ-110μ, $d(0.9)$=about 100μ-220μ.

Following pre-dispersion of the pregelatinized starch in water, the pregelatinized starch dispersion is added to the stucco-containing slurry. The resulting starch-containing stucco-containing slurry is deposited on a first paper cover sheet, and a second paper cover sheet is placed over the deposited slurry to form a gypsum wallboard. The gypsum wallboard is cut after the gypsum-containing slurry has hardened sufficiently for cutting, and the resulting gypsum wallboard is dried. Other conventional ingredients will also be used in the slurry including, as appropriate, dispersants (such as naphthalenesulfonates), strength additives (such as trimetaphosphates), accelerators, binders, paper fiber, glass fiber, and other known ingredients. A soap foam can be added to reduce the density of the final gypsum wallboard product.

BRIEF DESCRIPTION OF THE DRAWINGS

FIG. 1 is a graph depicting the particle size distribution and cumulative distribution of two representative samples of pregelatinized corn starch in one embodiment of the invention.

DETAILED DESCRIPTION OF THE INVENTION

In the present inventions it unexpectedly has been found that gypsum wallboard can be obtained using pregelatinized corn starch ground to specific particle size ranges, then pre-dispersed in water and added to a stucco-containing slurry. Any suitable standard commercial grinding equipment can be used for this purpose. Grinding can be achieved by using a sifter, for example.

Particle size distribution ("PSD") of the pregelatinized corn starch is a critical feature of the invention and should lie within the following range:

$d(0.1)$=about 20μ-35μ, $d(0.5)$=about 60μ-110μ, $d(0.9)$=about 100μ-220μ.

As shown in FIG. 1, the particle size range can be determined, for example, on a Sympatec Particle Size Analyzer (laser diffraction technique), available from Sympatech Gmbh (Clausthal-Zellerfeld, Germany), or other commercially available measuring instrument.

The above values represent percentages by volume, that is: d(0.1) indicates that 10% of the total volume of particles have a diameter less than or equal to about 20μ-35μ, while the remaining 90% have a diameter greater than 20μ-35μ; d(0.5) indicates that 50% of the total volume of particles have a diameter less than or equal to about 60μ-110μ, while 50% have a diameter greater than 60μ-110μ; and d(0.9) indicates that 90% of the total volume of particles have a diameter less than or equal to about 100μ-220μ, while the remaining 10% have a diameter greater than 100μ-220μ.

One preferred pregelatinized corn starch has a PSD of: d (0.1)=25μ, d (0.5)=80μ, d (0.9)=150μ. Another more preferred pregelatinized corn starch has a PSD of: d (0.1)=20μ, d (0.5)=60μ, d (0.9)=100μ.

Starches, including pregelatinized corn starch in particular, must be used in stucco-containing slurries prepared in accordance with the present invention. A preferred pregelatinized starch is pregelatinized corn flour, for example pregelatinized corn flour available from Bunge, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lb/ft³. Pregelatinized corn starch can be used in an amount up to about 10% by weight, based on the weight of dry stucco used in the stucco-containing slurry.

Other useful starches include, but are not limited to, pregelatinized rice starch and pregelatinized wheat starch.

Water/stucco (w/s) ratio, or "WSR," is an important parameter, since excess water must eventually be driven off by heating, which is wasteful, and expensive due to the high cost of the fuels used in the heating process. It is advantageous for the amount of process water, and consequently WSR, to be kept low. In the embodiments of the present invention, WSR can range from about 0.3 to about 1.5, depending on starch usage level and stucco characteristics (particle size/shape). In a preferred embodiment, WSR can range from about 0.3 to about 1.2, which range demonstrates a substantially lower water demand.

Naphthalenesulfonate dispersants can optionally be used in the present invention including polynaphthalenesulfonic acid and its salts (polynaphthalenesulfonates) and derivatives, which are condensation products of naphthalenesulfonic acids and formaldehyde. Particularly desirable polynaphthalenesulfonates include sodium and calcium naphthalenesulfonate. The average molecular weight of the naphthalenesulfonates can range from about 3,000 to 20,000, although it is preferred that the molecular weight be about 8,000 to 10,000. A higher molecular weight dispersant has higher viscosity, and generates a higher water demand in the formulation. Useful naphthalenesulfonates include LOMAR D, available from Henkel Corporation, DILOFLO, available from GEO Specialty Chemicals, Cleveland, Ohio, and DAXAD, available from Hampshire Chemical Corp., Lexington, Mass. It is preferred that the naphthalenesulfonates be used in the form of an aqueous solution, for example, in the range of about 40-45% by weight solids content.

The polynaphthalenesulfonates useful in the present invention have the general structure (I):

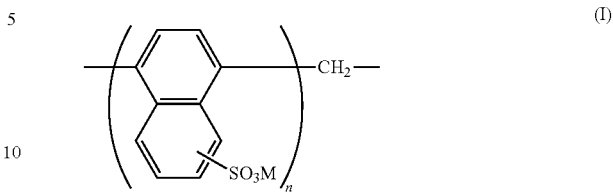

wherein n is >2, and wherein M is sodium, potassium, calcium, and the like.

For example, the naphthalenesulfonate dispersant, as an about 45% by weight solution in water, can be used in a range of from about 0.5% to about 2.5% by weight based on the weight of dry stucco used in the gypsum composite formulation. A preferred range of naphthalenesulfonate dispersant is from about 0.5% to about 1.5% by weight based on the weight of dry stucco, a more preferred range from about 0.7% to about 1.5% by weight based on the weight of dry stucco, and a most preferred range from about 0.7% to about 1.2% by weight based on the weight of dry stucco.

Strength additives, including metaphosphates and polyphosphates, can optionally be used in the embodiments of the present invention. Any suitable water-soluble metaphosphate or polyphosphate can be used in accordance with the present invention. It is preferred that a trimetaphosphate salt be used, including double salts, that is trimetaphosphate salts having two cations. Particularly useful trimetaphosphate salts include sodium trimetaphosphate, potassium trimetaphosphate, calcium trimetaphosphate, sodium calcium trimetaphosphate, lithium trimetaphosphate, ammonium trimetaphosphate, and the like, or combinations thereof. A preferred trimetaphosphate salt is sodium trimetaphosphate. It is preferred to use the trimetaphosphate salt as an aqueous solution, for example, in the range of about 10-15% by weight solids content. Other cyclic or acyclic polyphosphates can also be used, as described in U.S. Pat. No. 6,409,825 to Yu et al., herein incorporated by reference.

Sodium trimetaphosphate is a known strength additive in gypsum-containing compositions, although it is generally used in a range of from about 0.05% to about 0.08% by weight based on the weight of dry stucco used in the gypsum slurry. In embodiments of the present invention, sodium trimetaphosphate (or other water-soluble metaphosphate or polyphosphate) can be present in the range of from about 0.12% to about 0.4% by weight based on the weight of dry stucco used in the gypsum composite formulation. A preferred range of sodium trimetaphosphate (or other water-soluble metaphosphate or polyphosphate) is from about 0.12% to about 0.3% by weight based on the weight of dry stucco used in the gypsum composite formulation.

Paper fiber may be used in the embodiments of the present invention. A useful form of paper fiber is bleached or unbleached virgin paper fibers. Other cellulosic fibrous materials can be used, alone or in combination with paper fiber.

Accelerators can be used in the gypsum-containing compositions of the present invention, for example, wet gypsum accelerator (WGA), as described in U.S. Pat. No. 6,409,825 to Yu et al., herein incorporated by reference. One desirable heat resistant accelerator (HRA) can be made from the dry grinding of landplaster (calcium sulfate dihydrate). Small amounts of additives (normally about 5% by weight) such as sugar, dextrose, boric acid, and starch can be used to make this HRA. Sugar or dextrose are currently preferred. Another useful accelerator is "climate stabilized accelerator" or "climate stable accelerator," (CSA) as described in U.S. Pat. No. 3,573,947, herein incorporated by reference.

Gypsum wallboard made according to the embodiments of the present invention includes cover sheets or surface sheets, between which a set gypsum core is formed from a gypsum-containing slurry. In accordance with the invention, the gypsum-containing slurries will include pregelatinized corn starch with particles sizes as described above. The set gypsum-containing core material is sandwiched between two substantially parallel cover sheets, for example paper cover sheets. Various types of paper cover sheets are known in the art and all such types of paper cover sheets may be used in the present invention. Cover sheets comprising mats of glass or polymer fibers may also be used.

The pre-dispersed pregelatinized corn starch can be added at any point in the mixing process used to form the gypsum-containing slurry. Preferably, the pre-dispersed pregelatinized corn starch is added in the following manner: the aqueous pre-dispersed pregelatinized corn starch is injected into the stucco mixer, for example about 10 inches away from the existing water nozzles.

The pre-dispersion of pregelatinized starch can be about 10% by weight starch in water. In order to achieve the desired starch solution, the temperature of the water used to disperse and dissolve the large particle dry pregelatinized corn starch preferably will be above about 55° F. A Rotosolver® Disperser, available from Admix (Manchester, N.H.) may be used to help to eliminate fisheyes in the 10% pre-mixed pregelatinized corn starch suspension. For final grinding and dissolution, a Boston Shearpump® available from Admix (Manchester, N.H.) may be employed following the introduction of the pre-dispersed starch.

When the present invention is practiced by pre-dispersing the pregelatinized starch having the preferred PSD as discussed above in the making of the gypsum-containing slurries, water demand increases by only about 6-7 lb/MSF, while providing maximum strength improvement and bonding. That is, water demand is decreased from about 10 lb/MSF, resulting in cost savings. In addition, board weight of 12 inch gypsum wallboard made using these formulations can be reduced by about 100-150 lb/MSF, whether or not the starch is pre-dispersed.

The following examples further illustrate the invention. They should not be construed as in any way limiting the scope of the invention.

EXAMPLE 1

Sample Gypsum Slurry Formulation Containing Pre-Dispersed Aqueous Starch

An exemplary gypsum-containing slurry formulation is shown in Table 1 below. Values in Table 1 are expressed as weight percent based on the weight of dry stucco. Values in parentheses are dry weight in pounds (lb/MSF).

TABLE 1

| Component | Formulation A wt. % (lbs.) |
|---|---|
| Stucco (lb/MSF) | 100 (1186) |
| Pregelatinized corn starch | 0.84 (10) |
| sodium trimetaphosphate | 0.17 (1.99) |
| Dispersant (naphthalenesulfonate) | 0.30 (3.6) |
| Heat resistant accelerator (HRA) | 0.78 (9.3) |

TABLE 1-continued

| Component | Formulation A wt. % (lbs.) |
|---|---|
| Paper fiber | 0.34 (4.0) |
| Soap* | 0.02 (0.27) |
| Total Water (lb.) | 973 |
| Water/Stucco ratio | 0.82 |

*Used to pregenerate foam.

EXAMPLE 2

Preparation of Gypsum Wallboard Using Pre-Dispersed Starch

Sample gypsum wallboards were prepared using gypsum slurry Formulation A of Example 1, in accordance with U.S. Pat. Nos. 6,342,284 to Yu et al. and 6,632,550 to Yu et al., herein incorporated by reference, except that the pregelatinized corn starch was pre-dispersed in water at 70° F., and at 10% by weight. The pre-dispersed (wet) pregelatinized corn starch (aqueous dispersion) was added in the following manner: the aqueous pre-dispersed pregelatinized corn starch was injected into the stucco mixer at about 10 inches away from the existing water nozzles. This includes the separate generation of foam and introduction of the foam into the slurry of the other ingredients as described in Example 5 of these patents.

The resulting wallboard had a dry weight of 1501 lb/MSF, and a nail pull resistance value of 86.0 lbs., as shown in Table 2 below.

EXAMPLE 3

Comparison of ½ Inch Gypsum Wallboard Prepared with Pre-Dispersed (Wet) Pregelatinized Corn Starch and Dry Pregelatinized Corn Starch Test gypsum wallboards were prepared according to Example 2 (i.e. WET Formulation A), and compared to DRY Formulation A (using normal dry pregelatinized corn starch), and control. The starch used in DRY Formulation A slurry and in the control slurry was not pre-dispersed.

TABLE 2

| | Control Board | DRY Formulation A Board | WET [1] Formulation A Board |
|---|---|---|---|
| Test formulation component | | | |
| Dry stucco (lb/MSF) | 1265 | 1182 | 1186 |
| Pregelatinized corn starch (lb/MSF) | — | 10.0 | 10.0 [1] |
| Regular starch (lb/MSF) | 5.7 | — | — |
| Dispersant (naphthalenesulfonate) [2] (lb/MSF) | 4.0 | 8.0 | 8.0 |
| Sodium trimetaphosphate (lb/MSF) | 0.65 | 2.0 | 2.0 |
| Trial formulation test results | | | |
| Dry board weight (lb/MSF) | 1608 | 1500 | 1501 |
| Nail pull resistance (lb) [†] | 82.6 | 81.0 | 86.0 |
| 3 h Humidified bond [3] load, average (lb) | 14.8 | 15.5 | 14.8 |
| 3 h Humidified bond [3,4] failure (%) | 0.0 | 1.8 | 6.7 |

TABLE 2-continued

|  | Control Board | DRY Formulation A Board | WET [1] Formulation A Board |
|---|---|---|---|
| 16 h Humidified bond [3] load, average (lb) | 16.6 | 17.4 | 18.3 |
| 16 h Humidified bond [3,4] failure (%) | 0.0 | 1.8 | 4.9 |
| Edge hardness (lb) | 44-57 | 28-37 | 38-47 |
| Core hardness (lb) | 19.4 | 17.5 | 18.3 |
| Flexural strength, average (MD) (lb) | 52.3 | 52.5 | 51.2 |
| Flexural strength, average (CMD) (lb) | 148.1 | 150.0 | 150.4 |

[1] Starch pre-dispersed in water, 10% by weight
[2] 45% aqueous solution
[3] 90° F./90% Relative Humidity
[4] It is well understood that under these test conditions, percentage failure rates <50% are acceptable.
[†] ASTM standard: 77 lb
MD: machine direction
CMD: cross machine direction Nail pull resistance, edge and core hardness, and flexural strength tests were performed according to ASTM C-473. Additionally, it is noted that typical gypsum wallboard is approximately ½ inch thick and has a weight of between about 1600 to 1800 lb/MSF.

As shown in Table 2, the wallboards prepared using the Formulation A slurry, either WET or DRY, provided greater than 100 lb/MSF board weight reduction. Furthermore, the test results demonstrate that the WET Formulation A board, prepared using pre-dispersed starch, performed better than the DRY Formulation A board, particularly in nail pull resistance.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of making gypsum board, comprising:
    (a) providing pregelatinized starch having a particle size distribution within the following ranges:
        $d(0.1)$=from about 20μ to about 35μ,
        $d(0.5)$=from about 60μ to about 110μ,
        $d(0.9)$=from about 100μ to about 220μ;
    (b) dispersing the pregelatinized starch in water to form a pregelatinized starch dispersion;
    (c) introducing stucco to a mixer having nozzles that deliver water into the mixer and injecting the pregelatinized starch dispersion into the mixer adjacent the nozzles to fully disperse the starch in the resulting slurry;
    (d) disposing the slurry containing the dispersed starch between a first cover sheet and a second cover sheet to form a panel;
    (e) cutting the panel into a board of predetermined dimensions; and
    (f) drying the board.

2. The method of claim 1, wherein the pregelatinized starch is a pregelatinized corn starch.

3. The method of claim 2, wherein the pregelatinized corn starch is a ground pregelatinized corn starch.

4. The method of claim 1, further comprising introducing sodium trimetaphosphate into the mixer in an amount from about 0.12% to about 0.4% by weight based on the weight of the stucco, and introducing an about 45% by weight aqueous solution of a naphthalenesulfonate dispersant in an amount to deliver from about 0.5% to about 2.5% by weight naphthalenesulfonate dispersant based on the weight of the stucco.

5. The method of claim 1, in which the first cover sheet and the second cover sheet are made of paper.

6. The method of claim 1, in which the pregelatinized starch is a dispersion of about 10% by weight starch in water.

7. The method of claim 1, wherein the pregelatinized starch is present in an amount up to about 10% by weight based on the weight of the stucco.

8. The method of claim 1, wherein the pregelatinized starch has a particle size distribution of d (0.1)=about 25μ, d (0.5)=about 80μ, d (0.9)=about 150μ.

9. The method of claim 1, wherein the pregelatinized starch has a particle size distribution of d (0.1)=about 20μ, d (0.5)=about 60μ, d (0.9)=about 100μ.

10. The method of claim 1 in which the pregelatinized starch is dispersed in water at a temperature above about 55° F. (13° C.).

11. The method of claim 1, further comprising introducing water-soluble polyphosphate into the mixer in an amount from about 0.12% to about 0.4% by weight based on the weight of the stucco, and introducing naphthalenesulfonate dispersant in an amount to deliver from about 0.5% to about 2.5% by weight napthalenesulfonate dispersant based on the weight of the stucco.

12. A method of making gypsum board, comprising:
    (a) providing pregelatinized starch having a particle size distribution of d (0.1)=about 20μ, d (0.5)=about 60μ, d (0.9)=about 100μ;
    (b) dispersing the pregelatinized starch in water to form a pregelatinized starch dispersion;
    (c) introducing stucco to a mixer having nozzles that deliver water into the mixer, and injecting the pregelatinized starch dispersion into the mixer adjacent the nozzles to disperse the starch in the resulting slurry during a contact time with the stucco and water of less than one second;
    (d) disposing the slurry containing the dispersed starch between a first cover sheet and a second cover sheet to form a panel;

(e) cutting the panel into a board of predetermined dimensions; and (f) drying the board.

13. The method of claim 12 in which the pregelatinized starch is dispersed in water at a temperature above about 55° F. (13° C.).

14. A method of making gypsum board, comprising:
(a) providing ground pregelatinized starch having a particle size distribution within the following ranges:

$d(0.1)$=from about 20μ to about 35μ, $d(0.5)$=from about 60μ to about 110μ, $d(0.9)$=from about 100μ to about 220μ;

(b) dispersing the ground pregelatinized starch in water to form a ground pregelatinized starch dispersion;

(c) introducing stucco to a mixer having nozzles that deliver water into the mixer and injecting the ground pregelatinized starch dispersion into the mixer adjacent the nozzles to disperse the starch in the resulting slurry;

(d) disposing the slurry containing the dispersed starch between a first cover sheet and a second cover sheet to form a panel;

(e) cutting the panel into a board of predetermined dimensions; and (f) drying the board.

\* \* \* \* \*